(12) United States Patent
Chen et al.

(10) Patent No.: US 8,151,919 B2
(45) Date of Patent: Apr. 10, 2012

(54) VEHICLE-USED COMPOSITE BRAKING/ACCELERATING SYSTEM

(76) Inventors: Tien-Li Chen, Taipei (TW); Ten-Lee Chang, Taipei (TW)

( * ) Notice: Subject to any disclaimer, the term of this patent is extended or adjusted under 35 U.S.C. 154(b) by 189 days.

(21) Appl. No.: 12/651,857

(22) Filed: Jan. 4, 2010

(65) Prior Publication Data

US 2011/0162900 A1    Jul. 7, 2011

(51) Int. Cl.
*B60K 1/00* (2006.01)

(52) U.S. Cl. .................................. 180/65.51

(58) Field of Classification Search .... 180/65.21–65.29, 180/65.51

See application file for complete search history.

(56) References Cited

U.S. PATENT DOCUMENTS

| | | | |
|---|---|---|---|
| 7,597,164 B2 * | 10/2009 | Severinsky et al. | 180/65.27 |
| 7,863,789 B2 * | 1/2011 | Zepp et al. | 310/90 |
| 2010/0138127 A1 * | 6/2010 | Boughtwood | 701/71 |

* cited by examiner

*Primary Examiner* — J. Allen Shriver, II
*Assistant Examiner* — Erez Gurari
(74) *Attorney, Agent, or Firm* — Muncy, Geissler, Olds & Lowe, PLLC

(57) ABSTRACT

A vehicle-used composite braking/accelerating system is provided. In accordance with the composite braking/accelerating system, a movable motor is provided adjacent to a wheel of the vehicle. The movable motor is electrically connected to a control circuit and a battery. When the vehicle is moving and the moving vehicle is braked to decelerate, in which the driver of the vehicle slightly steps on the braking device, the control circuit instructs the movable motor to execute a generator function and drives the actuator to operate. The movable motor includes a coil member and a magnetic member. When the coil member and the magnetic member are correspondingly positioned and relatively rotated, the movable motor generates electrical energy, and saves the generated electrical energy into the battery. In such a way, the kinetic energy of the moving vehicle is transformed into electrical energy for saving the fuel consumption.

6 Claims, 5 Drawing Sheets

VEHICLE-USED COMPOSITE BRAKING/ACCELERATING SYSTEM

BACKGROUND OF THE INVENTION

1. Field of the Invention

The present invention relates generally to a vehicle-used composite braking/accelerating system. When a vehicle is braked to decelerate, the composite braking/accelerating system is used for transforming the kinetic energy of the moving vehicle into electrical energy and saving the electrical energy in a battery. When the vehicle is being driven to move forward or accelerate, the electrical energy saved in the battery can be outputted from the battery for facilitating to accelerating the vehicle, so as to save fuel consumption.

2. The Prior Arts

Recently, the automobile enterprises are fast developed. Driving a car usually helps to save the time spent on transportation. However, it also adversely consumes fuel and produces carbon dioxide, which is a main factor causing the green house effect and destroying the quality of the air. Typically, only 30% of fuel burned out by a vehicle engine is used for generating power to drive the vehicle, and almost all of the rest is converted in to heat which is dissipated and emitted out from the heat dissipation system and the flue gas emission system.

Since the petroleum source is going to be finally exhausted, and the earth is becoming warmer and warmer, it is the responsibility of us, particularly those automobile manufacturers who also produce air pollution and noise pollution, to improve the science and technology and driving habit for enhancing the vehicle fuel utilization factor. As reported by the Discovery Channel, the USA alone consumes ¼ of petroleum of the world, and 55% of which is consumed by 230 million vehicles. Roughly estimated in accordance with the report, it can be concluded that almost a half of the petroleum of world is being consumed as fuels of vehicles. The vehicles are seriously relying on the supply of petroleum and are drastically destroying the environment.

Even though almost all of the major automobile manufacturers have made effort to develop next generation cars, such as fuel-electric hybrid vehicles, the conventional gas/diesel engine cars still occupy most part of the car production in the world (about 90%). Therefore, in general, the effect of the effort for saving is not satisfactory as desired.

The reason of the high fuel consumption efficiency of the conventional gas/diesel engine cars may be because the overall design does not include more consideration about fuel saving. FIG. 1 illustrates an automatic transmission and braking system of a conventional gas/diesel engine vehicle. As shown in FIG. 1, the braking system decelerates the vehicle in a manner of introducing a friction. At the same time of decelerating the vehicle, the kinetic energy of the moving vehicle is transformed into heat which not only is useless but also requires further equipment for heat dissipation. Further, the vehicle also contains a battery for providing necessary power supply for electrical and electronic components of the vehicle. The battery is usually charged by the running engine when the engine is in operation. However, in a conventional gas/diesel engine vehicle, the energy transformation between the engine and the battery is unidirectional, in that the electrical energy saved in the battery cannot be retrieved therefrom for reversely facilitating the engine for accelerating the vehicle.

SUMMARY OF THE INVENTION

A primary objective of the present invention is to provide a vehicle-used composite braking/accelerating system. The composite braking/accelerating system includes a smart electronic transmission control (ETC) system, and a movable motor, and is adapted for recycling the kinetic energy of the moving vehicle when the vehicle is braked to decelerate, in that the recycled kinetic energy is transformed into electrical energy and saved into a battery. When the battery contains sufficient electrical energy saved therein, the composite braking/accelerating system allows the battery to output the electrical energy for driving the vehicle to move, so as to save the fuel consumption. When the electrical energy saved in the battery is insufficient, the engine of the vehicle operates to drive the vehicle and may even charge the battery. When the vehicle is solely driven by the engine, an actuator disengages the movable motor from the tire system, so as to completely exert the capacity of the engine and eliminate the restraint of the movable motor.

For achieving the objective of the present invention, a vehicle-used composite braking/accelerating system is provided. In accordance with the composite braking/accelerating system, a movable motor is provided adjacent to a wheel of the vehicle. The movable motor is electrically connected to a control circuit and a battery. When the vehicle is moving and the moving vehicle is braked to decelerate, in which the driver of the vehicle slightly steps on the braking device, the control circuit instructs the movable motor to execute a generator function and drives the actuator to operate. The movable motor includes a coil member and a magnetic member. The magnetic member includes a permanent magnet. When the coil member and the magnetic member are correspondingly positioned and relatively rotated, the movable motor generates electrical energy, and saves the generated electrical energy into the battery. In such a way, the kinetic energy of the moving vehicle is transformed into electrical energy for saving the fuel consumption.

When the driver of the vehicle applies a stronger force stepping on the braking device, the braking system of the vehicle is enabled to further decelerate the moving vehicle. Accordingly, the composite braking/decelerating system is adapted for facilitating to accelerate the vehicle when vehicle is driven to move forward. When the electrical energy saved in the battery is sufficient and the tire rotation speed is lower than a predetermined value, the control circuit instructs the movable motor to execute a motor-output-power function, in which the battery outputs the electrical energy to the coil member and the actuator is instructed to operate, so that the coil member and the magnetic member are effectively and relatively rotated to drive the wheel to rotate.

According to an aspect of the present invention, the control circuit is further adapted for receiving a steering angle data of a steering wheel of the vehicle, and calculating the same, so as to precisely output the electrical energy thereto and properly accelerate the wheel. According to an alternative aspect of the present invention, the control circuit further includes a mapping table, according to which the movable motor of each tire outputs individual corresponding powers with respect to different steering angles for maintaining the vehicle being driven stably.

Furthermore, when the vehicle is driven in a rainy weather or a slippery road, the control circuit is also adapted for monitoring the rotation speed of each tire for adjusting the output of each motor so as to avoid the tire slippage.

In addition, the present invention further includes an information display unit electrically connected to the control circuit. The information display unit is preferably disposed at an instrument panel positioned in front of the driver seat, so as to allow the driver to clearly view related data including motor rotation speeds, moving status, electrical energy volume of the battery, and electrical energy consumption information.

BRIEF DESCRIPTION OF THE DRAWINGS

The present invention will be apparent to those skilled in the art by reading the following detailed description of preferred embodiments thereof, with reference to the attached drawings, in which.

DETAILED DESCRIPTION OF THE PREFERRED EMBODIMENT

Figure 1:
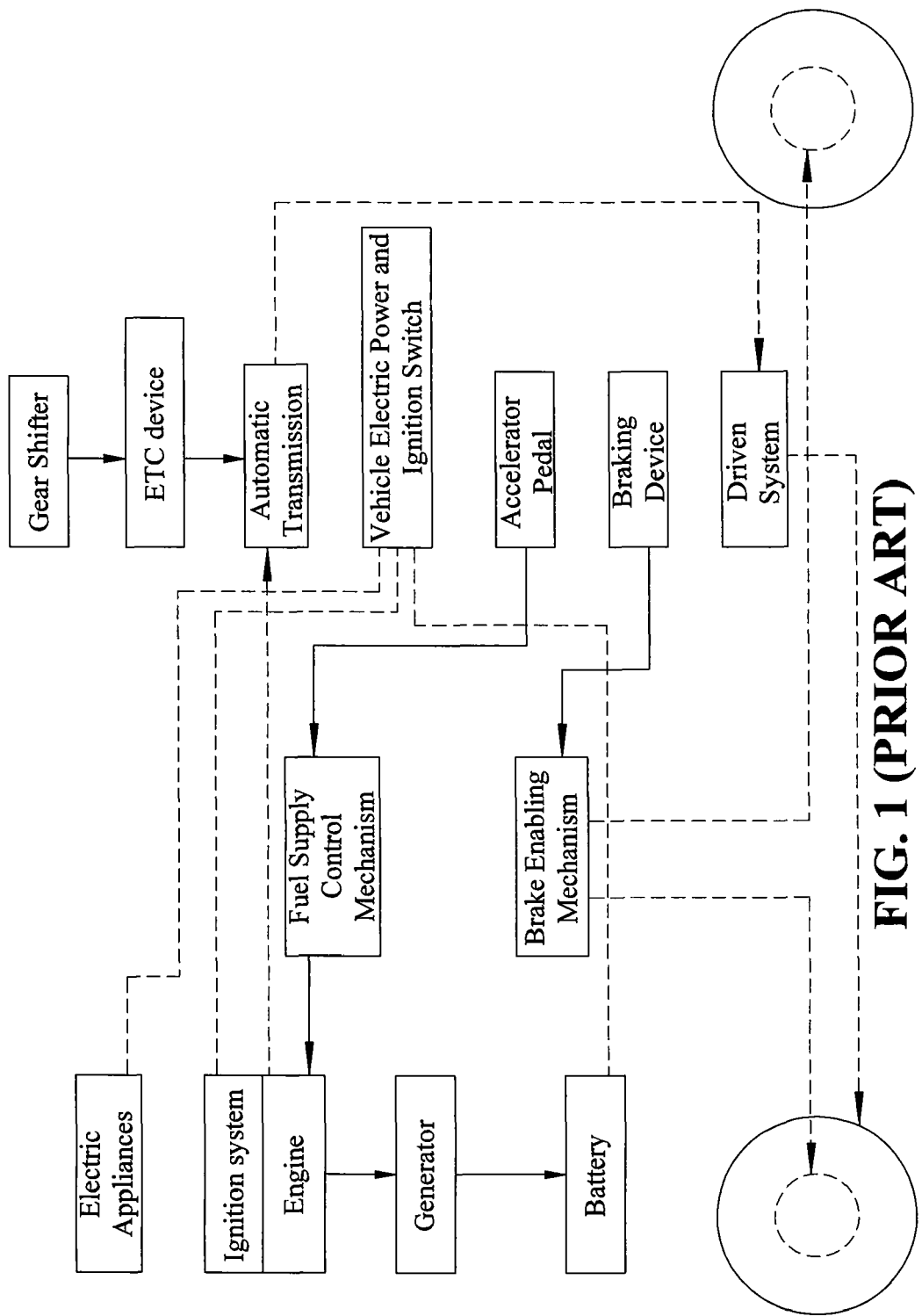
FIG. 1 is a schematic diagram illustrating a driving and braking device of a conventional vehicle.

The accompanying drawings are included to provide a further understanding of the invention, and are incorporated in and constitute a part of this specification. The drawing illustrates embodiments of the invention and, together with the description, serves to explain the principles of the invention.

Figure 2:
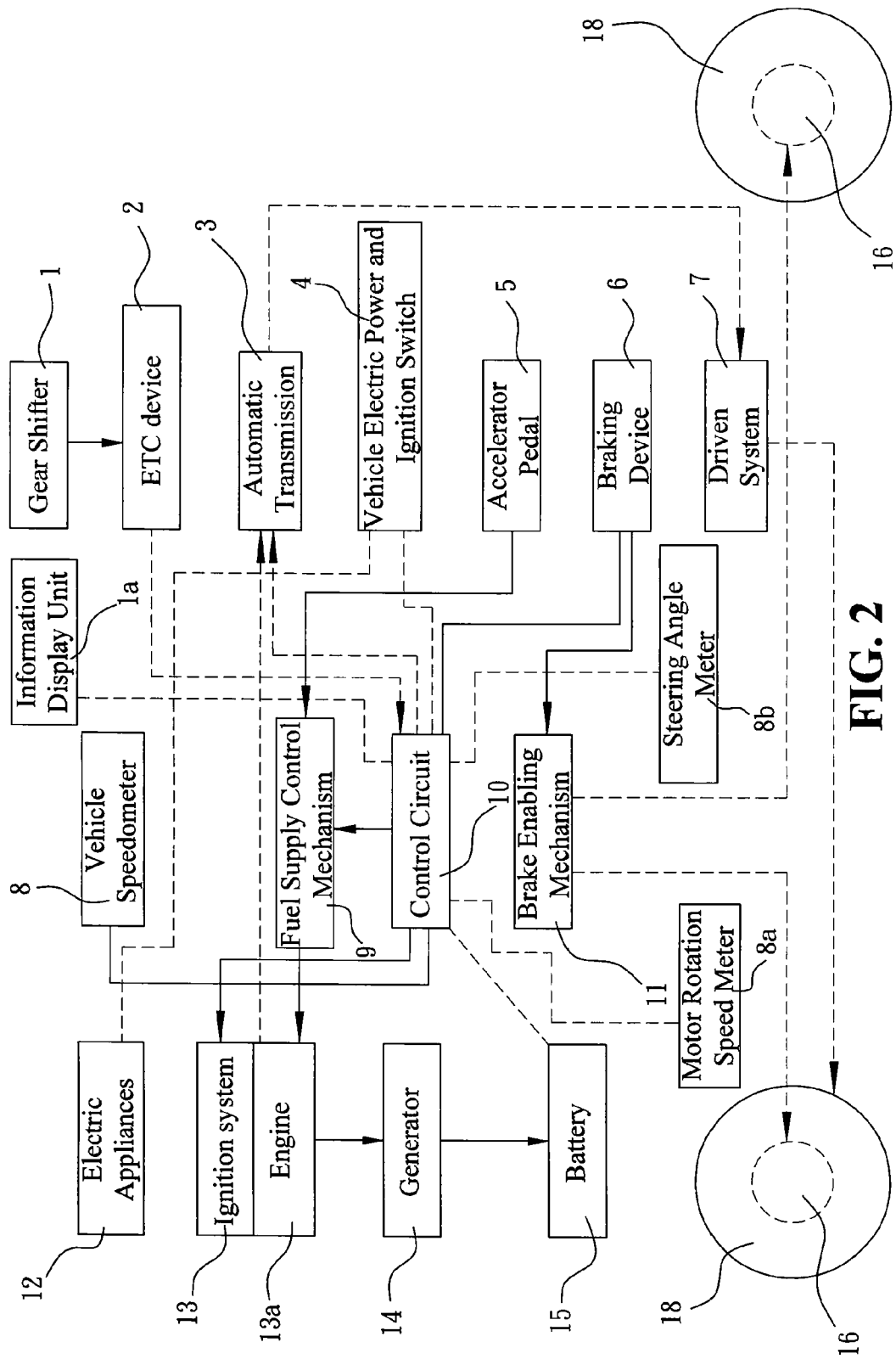
FIG. 2 is a schematic diagram illustrating an embodiment of the present invention.

FIG. 2 is a schematic diagram illustrating an embodiment of the present invention. Referring to FIG. 2, there is shown a vehicle-used composite braking/accelerating system. The composite braking/accelerating system is adapted for a vehicle including an additional smart electronic transmission control (ETC) system. The smart ETC system includes an engine 13a, an ignition system 13 of the engine 13a, a generator 14, a control circuit 10, a vehicle speedometer 8, a battery 15, a fuel supply control mechanism 9, a gear shifter 1, an ETC device 2, an automatic transmission 3, a vehicle electric power and ignition switch 4, an accelerator pedal 5, a braking device 6, and a driven system 7. The control circuit 10 is electrically connected to the battery 15, the vehicle speedometer 8, the ignition system 13, the ETC device 2, the automatic transmission 3, the vehicle electric power and ignition switch 4, and the braking device 6 which is adapted for enabling a brake enabling mechanism 11 for controlling a brake system 16 equipped at wheels 18 of the vehicle. The control circuit 10 is further electrically connected to an information display unit 1a and a steering angle meter 8b. According to the first embodiment of the present invention, the vehicle-used composite braking/accelerating system includes a movable motor 17 directly or indirectly electrically connected to the control circuit 10 provided at each wheel or each driving wheel 18 of the vehicle. In accordance with the present invention, the control circuit 10 is included as a part of the composite braking/accelerating system, and is adapted for instructing the movable motors 17 to move for proper operation according to practical driving status or conditions of the vehicle, so as to recycle the kinetic energy of the moving vehicle and transforming the recycled kinetic energy into electrical energy and saving the same into the battery 15. The electrical energy saved in the battery 15 can also be used for driving the vehicle, or alternatively, the vehicle can also be driven by both the battery 15 and the engine 13a, or solely the engine 13a. Any signal communication among components foregoing introduced as being electrically connected to the control circuit 10 must be controlled by the control circuit 10.

Figure 3:
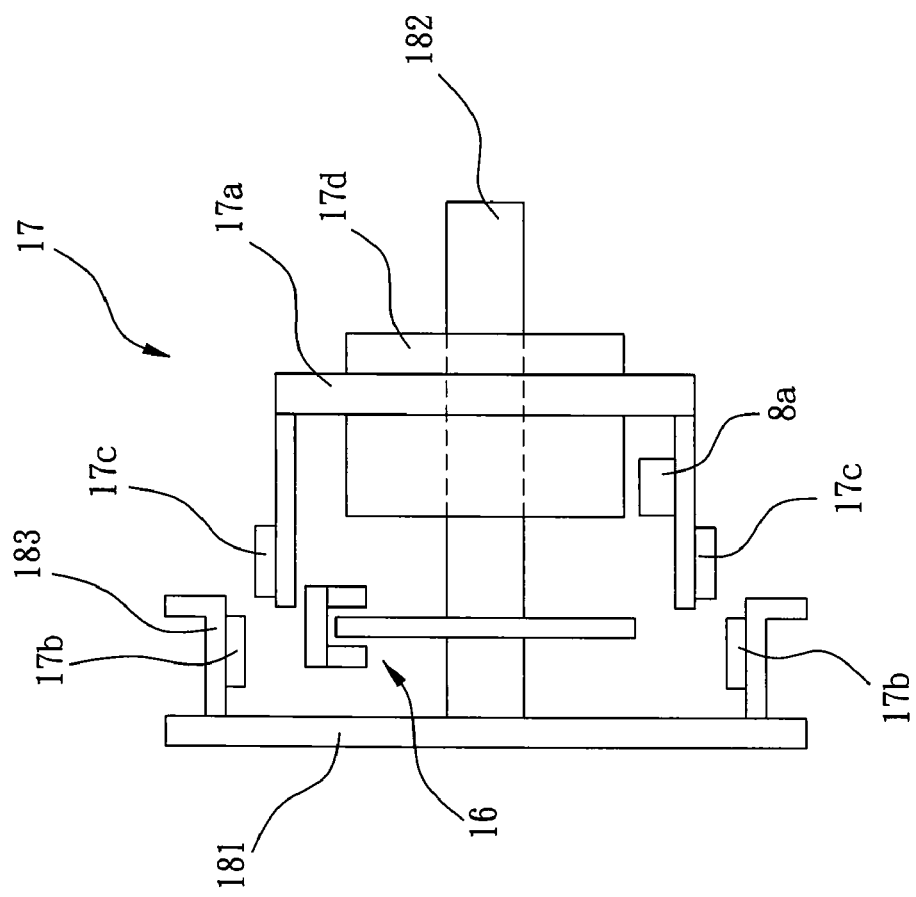
FIG. 3 illustrates a first embodiment of the movable motor according to the present invention, in which the coil member and the magnetic member are not correspondingly positioned.

FIG. 3 illustrates a first embodiment of the movable motor according to the present invention, in which the coil member and the magnetic member are not correspondingly positioned. Referring to FIG. 3, the movable motor 17 includes an actuator 17a, a magnetic member 17b, a coil member 17c, and a fixing member 17d. The magnetic member 17b is secured to an accessory 183 attached to a rim 181 of the wheel 18, so that the magnetic member 17b can rotate together with the rim 181, when the vehicle is being driven. The coil member 17c is secured to the actuator 17a. The fixing member 17d is adapted for securing the movable motor 17 to a body of the vehicle. The rims 181 are secured to an axle 182, and the axle 182 is positioned through the fixing member 17d, and coupled to the driven system 7 of the wheels 17. The actuator 17a is movably coupled to the fixing member 17d, and the coil member 17c is electrically connected to the control circuit 10. According to an aspect of the embodiment, the actuator 17a is directly connected to the control circuit 10. Alternatively, the actuator 17a can also be indirectly connected to the control circuit 10 in a photo-driving, electromagnetic driving, or air driving manner. In such a way, the control circuit 10 can generate an instruction to directly or indirectly turns on the actuator 17a to axially moving relative to the fixing member 17d, or generate an instruction to shut down the actuator 17a, so that the coil member 17c is moved to a position which is not corresponding to the magnetic member 17b, and thus the coil member 17c and magnetic member 17b cannot sense each other.

Figure 4:
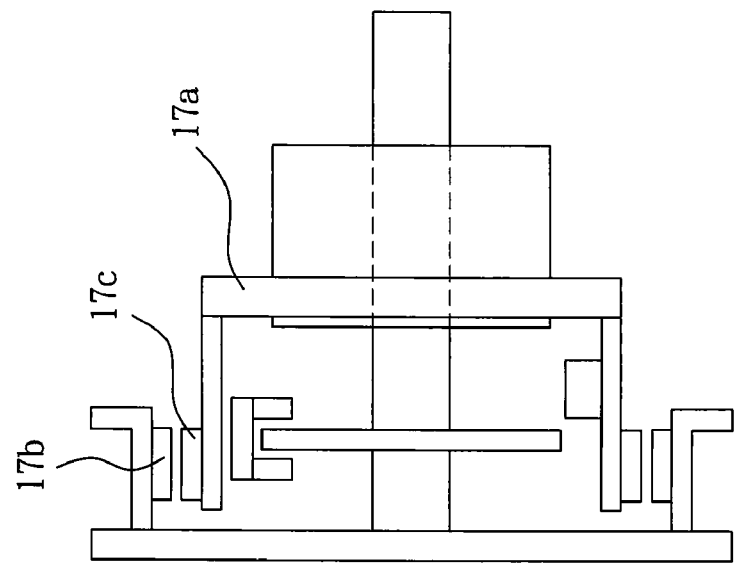
FIG. 4 illustrates the embodiment as shown in FIG. 3, while the coil member and the magnetic member are correspondingly positioned and rotated relative to each other.

In accordance with the present invention, when the vehicle is moving, and when the driver of the vehicle intends to brake and decelerate the vehicle, he can slightly steps on the braking device 6. Then, the control circuit 10 instructs the movable motor to execute a generator function and drives the actuator 17a to operate. Therefore, the coil member 17c is moved to a position in correspondence to the magnetic member 17b as shown in FIG. 4. In this way, there is an effective relative rotation generated between the coil member 17c and the magnetic member 17b which is rotating together with the rim 181. Such an effective relative rotation generated therebetween generates electrical energy, and the generated electrical energy is then saved into the battery 15. In such a way, the kinetic energy of the moving vehicle is transformed into electrical energy for saving the energy loss. The driver can then apply a stronger force onto the braking device 6 to enable the brake enabling mechanism 11, so as to enable the brake system 16 to further decelerate the vehicle.

In addition, the movable motor 17 is also adapted for facilitating to accelerate the vehicle. When the electrical energy saved in the battery 15 is sufficient, and the vehicle speed is lower than a predetermined value, the control circuit 10 instructs the movable motor 17 to execute a motor-output-power function, in which the battery 15 outputs the electrical energy to the coil member 17c and the actuator is instructed to operate, so that the coil member 17c is moved to the position in correspondence with the magnetic member 17b. The electrical energy saved in the battery 15 then drives the magnetic member 17b to effectively rotate relative to the coil member 17c, so as to drive the axle 182 and the rim 181 to rotate. In other words, the movable motor 17 outputs a power to drive the vehicle to move. Referring to FIG. 2 again, in this driving mode, the control circuit 10 neglects the gear signal of the ETC device 2 and output an N-gear signal to the automatic transmission 3, so as to automatically shift the gear to N-gear, and then the ignition system 13 of the engine 13a is turned off for saving fuel consumption.

When the system indicates that the electrical energy saved in the battery 15 is insufficient or the speed of the vehicle is higher than the predetermined value, the control circuit 10 automatically controls the ignition system 13 of the engine 13a to restart the engine 13a, so as to turn on the generator 14 to charge the battery 15. Meanwhile, a previous gear signal executed prior to turning off the engine 13a is sent to the automatic transmission 3, and the engine 13a drives the vehicle to move forward. In this time, the control circuit 10 also turns off the actuator 17a (i.e., instructing the actuator 17a remain not working), and at the same time, the control circuit controls the battery 15 not to supply electric energy to the coil member 17c of the movable motor 17, so that the effective relative rotation between the coil member 17c and the magnetic member 17b including the permanent magnet cannot be generated. This status should be maintained until the electrical energy saved in the battery 15 becomes sufficient, and thus in case the vehicle speed is lower than the predetermined value, the movable motor 17 can output to drive the vehicle again.

In accordance with the first embodiment as shown in FIGS. 3 and 4, the movable motor 17a is controlled to operate or not so as to control a distance between the coil member 17c and the magnetic member 17b. Specifically, as shown in FIG. 3, the control circuit 19 turns off the actuator 17a so that the actuator 17a does not operate, so that the coil member 17c remains apart from the magnetic member 17b, and thus there is no effective relative rotation can be generated therebetween for generating electrical energy or outputting power. As shown in FIG. 4, the control circuit 19 turns on the actuator 17a so that the actuator 17a operates, and then the coil member 17c is moved toward the rim 181 to a position corresponding to and adjacent to the magnetic member 17b which is being rotated together with the rim 181, and thus an effective relative rotation can be generated therebetween. In accordance with the instruction of the control circuit 10, the effective relative rotation therebetween can generate electrical energy, or output a power.

Figure 6:
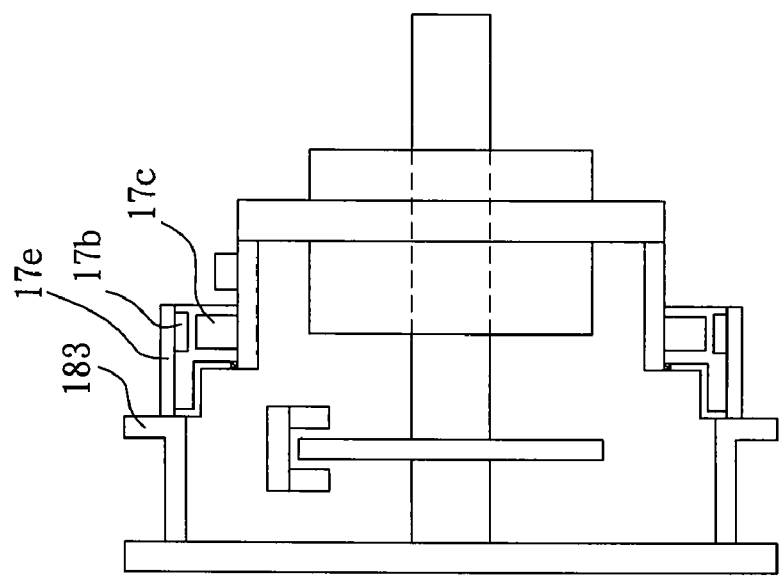
FIG. 6 illustrates the embodiment as shown in FIG. 5, while the coil member and the magnetic member are allowed to rotate relative to each other.
Figure 5:
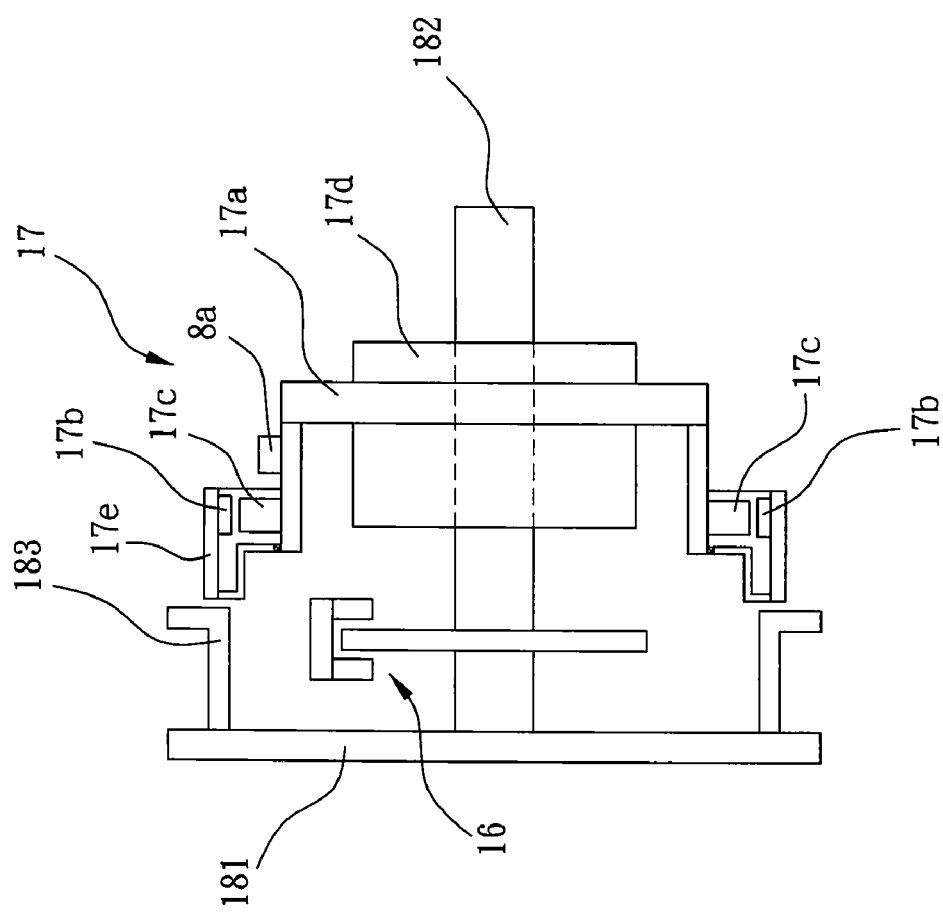
FIG. 5 illustrates a second embodiment of the present invention, in which the coil member and the magnetic member are restricted from rotation relative to each other.

FIG. 5 illustrates a second embodiment of the present invention, in which the coil member and the magnetic member are restricted from rotation relative to each other. FIG. 6 illustrates the embodiment as shown in FIG. 5, while the coil member and the magnetic member are allowed to rotate relative to each other. As shown in FIGS. 5 and 6, the movable motor 17 further includes a rotation mechanism 17e. The actuator 17a is not rotatable, while the rotation mechanism 17e is rotatable and the rotation mechanism 17e is secured to the actuator 17a, and the magnetic member 17b including the permanent magnet is secure to the rotation mechanism 17e. In accordance with the first embodiment as shown in FIGS. 5 and 6, the movable motor 17a is controlled to operate or not so as to control a distance between the rotation mechanism 17e and an inner side of the accessory 183 of the rim 181. Referring to FIG. 5, when the control circuit 10 turns off the actuator 17a so as to control the actuator not to operate, the rotation mechanism 17e is kept apart from the inner side of the accessory 183 of the rim 181, and thus there is no effective relative rotation can be generated between the coil member 17c and the magnetic member 17b for generating electrical energy or outputting power. As shown in FIG. 6, the control circuit 10 turns on the actuator 17a so that the actuator 17a operates, and then the rotation mechanism 17e is moved toward the rim 181 to get joint with the inner side of the accessory 183 of the rim 181, and thus an effective relative rotation can be generated therebetween. In accordance with the instruction of the control circuit 10, the effective relative rotation therebetween can generate electrical energy, or output a power.

Figure 8:
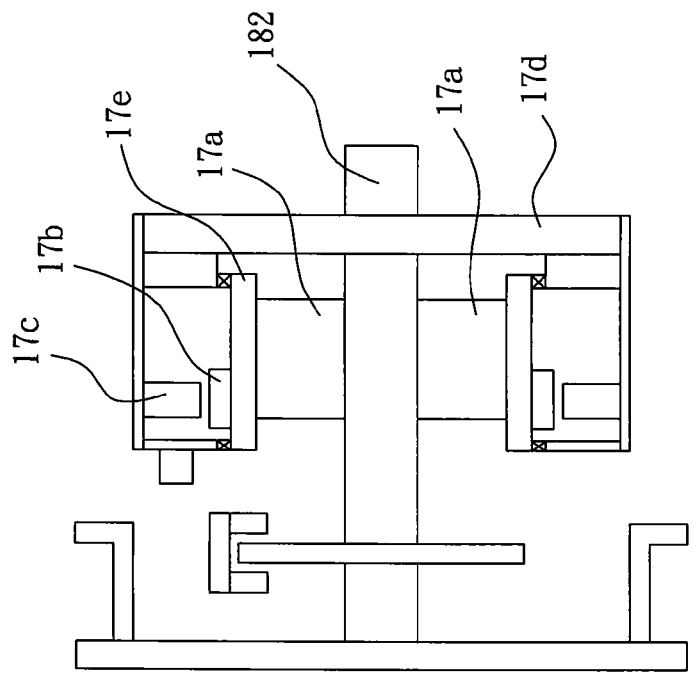
FIG. 8 illustrates the embodiment as shown in FIG. 7, while the coil member and the magnetic member are allowed to rotate relative to each other.
Figure 7:
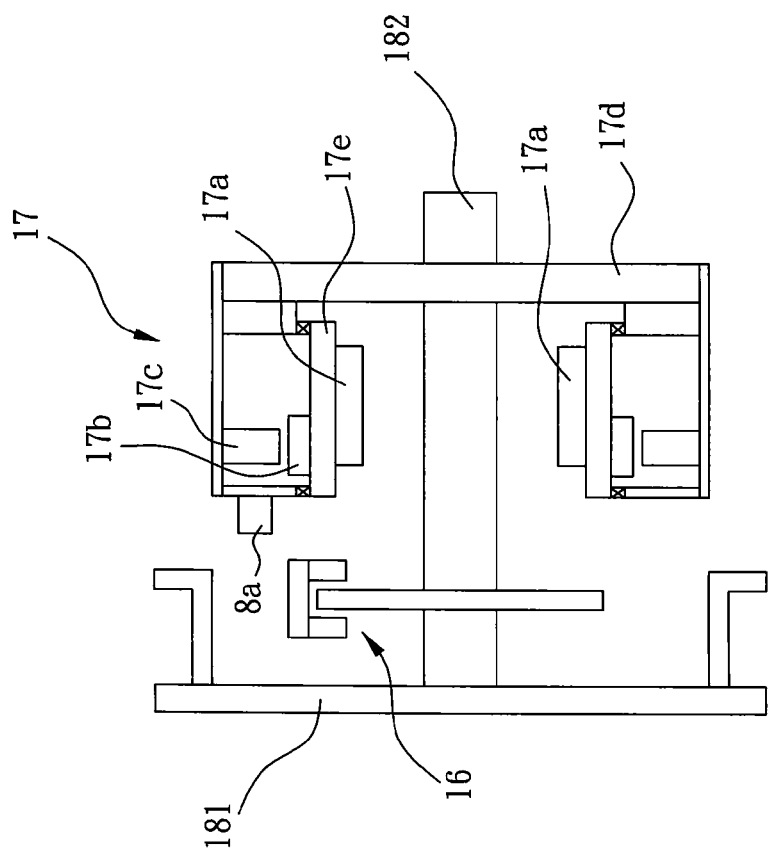
FIG. 7 illustrates a third embodiment of the present invention, in which the coil member and the magnetic member are restricted from rotation relative to each other.

FIG. 7 illustrates a third embodiment of the present invention, in which the coil member and the magnetic member are restricted from rotation relative to each other. FIG. 8 illustrates the embodiment as shown in FIG. 7, while the coil member and the magnetic member are allowed to rotate relative to each other. As shown in FIGS. 7 and 8, the rotation member 17e is secured to the fixing member 17d, and the coil member 17c and the magnetic member 17b are disposed at corresponding positions of the fixing member 17d and the rotation 17e respectively. The actuator 17a is disposed on the rotation mechanism 17e, and thus the actuator 17a is allowed to rotate together with the rotation mechanism 17e. Referring to FIG. 7, when the control circuit 10 turns off the actuator 17a so as to control the actuator not to operate, the actuator 17a remains apart from the axle 182 which is rotation together with the rim 181, and thus there is no effective relative rotation can be generated between the coil member 17c and the magnetic member 17b for generating electrical energy or outputting power. As shown in FIG. 8, the control circuit 19 turns on the actuator 17a so that the actuator 17a operates, and then the actuator 17a is moved toward the axle 182 which is rotating together with the rim 181 to get joint with the axle 182 so that the magnetic member 17b rotates together with the axle 182 via the rotation mechanism 17e and the actuator 17a, and thus an effective relative rotation can be generated between the coil member 17c and the magnetic member 17b. In accordance with the instruction of the control circuit 10, the effective relative rotation therebetween can generate electrical energy, or output a power.

When the movable motor 17 is applied for a motorcycle, it can be equipped to one wheel or two. When applied to a three-wheel vehicle, the movable motor 17 can be equipped to one, two or all of the three wheels. When applied to a four-wheel vehicle, the movable motor 17 can be equipped to either two or four wheels.

With respect to a four-wheel vehicle, if two front wheels of the vehicle are equipped with the movable motors 17, the control circuit 10 is further adapted for receiving a steering angle data of a steering wheel of the vehicle from a steering angle meter 8b, and calculating the same, so as to precisely output the electrical energy thereto and properly accelerate the wheel. According to an alternative aspect of the present invention, the control circuit 10 further includes a mapping table, according to which the movable motor 17 of each wheel outputs individual corresponding powers with respect to different steering angles for maintaining the vehicle being driven stably. Further, the control circuit 10 is adapted for monitoring instant moving speed of the vehicle, and is allowed to adjust an output ratio between the engine 13a and the movable motor 17 for saving fuel consumption.

Furthermore, when the vehicle is driven in a rainy weather or a slippery road, the control circuit 10 is also adapted for monitoring the rotation speed of each tire 18 for adjusting the output of each movable motor 17 so as to avoid the tire slippage.

Although the present invention has been described with reference to the preferred embodiments thereof, it is apparent to those skilled in the art that a variety of modifications and changes may be made without departing from the scope of the present invention which is intended to be defined by the appended claims.

What is claimed is:

1. A vehicle-used composite braking/accelerating system adapted for being installed in a vehicle for recycling a kinetic energy of the vehicle and facilitating acceleration of the vehicle, comprising:
   a control circuit;
   a battery, electrically connected to the control circuit;
   a movable motor, comprising:
      an actuator, directly or indirectly electrically connected to the control circuit;
      a coil member, secure to the actuator, and electrically connected to the control circuit; and
      a magnetic member, adapted for being effectively rotated relative to the coil member,
   wherein the actuator can be controlled by the control circuit to move so as to actuate the coil member to approach to or depart from the magnetic member, so that the coil member and the magnetic member are controlled to be sensed or not sensed each other,
   wherein the actuator comprises a rotatable rotation mechanism, wherein the magnetic member is secured to the rotation mechanism, and the coil member is secured to the actuator, when the control circuit turns off the actuator to control the actuator not to operate, the rotation mechanism is apart from an accessory secured to the rim, so that the coil member and magnetic member are not correspondingly positioned, and cannot generate effective rotation relative to each other, and when the control circuit turns on the actuator, the rotation mechanism moves toward the accessory secured to the rim to get in conjunction with the accessory, so as to have the coil member and magnetic member correspondingly positioned, so as to conduct a power generation function or a power output function in accordance with an instruction from the control circuit.

2. The vehicle-used composite braking/accelerating system according to claim 1, wherein when the vehicle is braked to decelerate, the control circuit turns on the actuator to have the coil member and magnetic member correspondingly positioned, so that the magnetic member effectively rotates relative to the coil member and generate electrical energy, and the generated electrical energy is saved in the battery; when the electrical energy saved in the battery is determined as sufficient and when the vehicle is being driven to accelerate, the control circuit turns on the actuator to have the coil member and magnetic member correspondingly positioned, so that the battery is allowed to output the electrical energy to the coil member so as to drive the vehicle to move; when the electrical energy saved in the battery is determined as insufficient, the control circuit controls the vehicle to be driven solely by an engine of the vehicle, and at the same time, the engine also charges the battery, and the actuator is turned off; and when the vehicle is driven with a speed high that a rotation threshold of the movable motor is exceeded, the control circuit turns off the actuator to have the coil member and magnetic member not correspondingly positioned, so that the magnetic member cannot effectively rotate relative to the coil member.

3. The vehicle-used composite braking/accelerating system according to claim 2, wherein the control circuit is adapted for monitoring instant moving speed of the vehicle, and is allowed to adjust an output ratio between the engine and the movable motor for saving fuel consumption.

4. A vehicle-used composite braking/accelerating system adapted for being installed in a vehicle for recycling a kinetic energy of the vehicle and facilitating acceleration of the vehicle, comprising:
   a control circuit;
   a battery, electrically connected to the control circuit;
   a movable motor, comprising:
      an actuator, directly or indirectly electrically connected to the control circuit;
      a coil member, secure to the actuator, and electrically connected to the control circuit; and
      a magnetic member, adapted for being effectively rotated relative to the coil member,
   wherein the actuator can be controlled by the control circuit to move so as to actuate the coil member to approach to or depart from the magnetic member, so that the coil member and the magnetic member are controlled to be sensed or not sensed each other, and
   wherein the actuator is further provided with a rotatable mechanism, the rotation mechanism is secured to a fixing member used for connecting with a body of the vehicle, wherein the coil member and the magnetic member are respectively disposed at corresponding positions of the fixing member and the rotation mechanism, wherein the actuator is adapted to rotate together with the rotation mechanism, and when the control circuit turns off the actuator to control the actuator not to operate, the actuator remains apart from an axle which rotates together with the rim, so that the coil member and magnetic member are not correspondingly positioned, and cannot generate effective rotation relative to each other, and when the control circuit turns on the actuator, the rotation mechanism moves toward the axle to get in conjunction with the axle, so as to have the coil member and magnetic member correspondingly positioned, so as to conduct a power generation function or a power output function in accordance with an instruction from the control circuit.

5. The vehicle-used composite braking/accelerating system according to claim 4, wherein when the vehicle is braked to decelerate, the control circuit turns on the actuator to have the coil member and magnetic member correspondingly positioned, so that the magnetic member effectively rotates relative to the coil member and generate electrical energy, and the generated electrical energy is saved in the battery; when the electrical energy saved in the battery is determined as sufficient and when the vehicle is being driven to accelerate, the control circuit turns on the actuator to have the coil member and magnetic member correspondingly positioned, so that the battery is allowed to output the electrical energy to the coil member so as to drive the vehicle to move; when the electrical energy saved in the battery is determined as insufficient, the control circuit controls the vehicle to be driven solely by an engine of the vehicle, and at the same time, the engine also charges the battery, and the actuator is turned off; and when the vehicle is driven with a speed high that a rotation threshold of the movable motor is exceeded, the control circuit turns off the actuator to have the coil member and magnetic member not correspondingly positioned, so that the magnetic member cannot effectively rotate relative to the coil member.

6. The vehicle-used composite braking/accelerating system according to claim 5, wherein the control circuit is adapted for monitoring instant moving speed of the vehicle, and is allowed to adjust an output ratio between the engine and the movable motor for saving fuel consumption.

* * * * *